United States Patent
Okuda (10) Patent No.: US 9,454,216 B2
(45) Date of Patent: Sep. 27, 2016

(54) ELECTRONIC DEVICE THAT SELECTIVELY STORES IMAGE DATA IN A NONVOLATILE STORAGE DEVICE OR MEMORY UPON HIBERNATION

(71) Applicant: KYOCERA Document Solutions Inc., Osaka (JP)

(72) Inventor: Masaya Okuda, Osaka (JP)

(73) Assignee: KYOCERA Document Solutions Inc. (JP)

( * ) Notice: Subject to any disclaimer, the term of this patent is extended or adjusted under 35 U.S.C. 154(b) by 157 days.

(21) Appl. No.: 14/334,926

(22) Filed: Jul. 18, 2014

(65) Prior Publication Data

US 2015/0026497 A1    Jan. 22, 2015

(30) Foreign Application Priority Data

Jul. 18, 2013  (JP) .................................. 2013-149738
Jul. 18, 2013  (JP) .................................. 2013-149739

(51) Int. Cl.
*G06F 13/00*   (2006.01)
*G06F 1/32*    (2006.01)
*G06F 11/14*   (2006.01)
(Continued)

(52) U.S. Cl.
CPC ............ *G06F 1/3275* (2013.01); *G06F 9/4418* (2013.01); *G06F 11/1458* (2013.01); *G06F 12/0246* (2013.01); *G06F 9/50* (2013.01);
(Continued)

(58) Field of Classification Search
CPC ...... G06F 13/00; G06F 17/5072; G06F 9/50; G06F 3/061; G06F 13/1657; G06F 12/0842; G06F 11/2043

USPC .......................................................... 711/165
See application file for complete search history.

(56) References Cited

U.S. PATENT DOCUMENTS 7,356,677 B1 * 4/2008 Rafizadeh ............ G06F 9/4418
                                                    713/1
8,862,709 B2 * 10/2014 Cromer ................ G06F 9/4416
                                                    709/222

(Continued)

FOREIGN PATENT DOCUMENTS

JP    2004-038545 A    2/2004
JP    2009-146061 A    7/2009
JP    2013-114555 A    6/2013

OTHER PUBLICATIONS

Anonymous, System and method for a space optimized selective hibernation in a computer system, The IP.com Journal, IP.com Inc., Dec. 17, 2012.

*Primary Examiner* — Mardochee Chery
(74) *Attorney, Agent, or Firm* — McDonnell Boehnen Hulbert & Berghoff LLP (57) ABSTRACT

An electronic device includes a main processor and a first memory. The main processor is configured to: determine whether or not specific data is stored in a first IO memory area of the first memory; generate a first piece of image data based on an OS memory area of the first memory; store the first piece of image data to a nonvolatile storage device; generate a second piece of image data based on the OS memory area of the first memory and the first IO memory area of the first memory; store the second piece of image data to the nonvolatile storage device; restore the software program to the OS memory area from the first piece of image data; and restore the software program to the OS memory area and the specific data to the first IO memory area from the second piece of image data.

15 Claims, 6 Drawing Sheets

(51) Int. Cl.
  *G06F 12/02* (2006.01)
  *G06F 9/44* (2006.01)
  G06F 9/50 (2006.01)
  G06F 13/40 (2006.01)
  G06F 13/24 (2006.01)

(52) U.S. Cl.
  CPC ........... *G06F13/24* (2013.01); *G06F 13/4081* (2013.01); *G06F 2212/7207* (2013.01)

(56) References Cited

U.S. PATENT DOCUMENTS

| | | | |
|---|---|---|---|
| 2007/0130624 A1* | 6/2007 | Shah | G06F 21/566 726/24 |
| 2009/0157960 A1 | 6/2009 | Koga | |
| 2010/0299513 A1* | 11/2010 | Ryu | G06F 13/1694 713/2 |
| 2012/0271990 A1* | 10/2012 | Chen | G06F 11/1441 711/103 |

* cited by examiner

ELECTRONIC DEVICE THAT SELECTIVELY STORES IMAGE DATA IN A NONVOLATILE STORAGE DEVICE OR MEMORY UPON HIBERNATION

REFERENCE TO RELATED APPLICATIONS

This application is based upon and claims the benefit of priority from the corresponding Japanese Patent Application No. 2013-149738, filed in the Japan Patent Office on Jul. 18, 2013, and Japanese Patent Application No. 2013-149739, filed in the Japan Patent Office on Jul. 18, 2013, the entire contents of which are incorporated herein by reference.

FIELD

The present disclosure generally relates to an electronic device that executes hibernation.

BACKGROUND

In a typical hibernation technology, when an electronic device is shifted from an operating state to a hibernation state, data within an entire area of a memory is saved to a nonvolatile storage device as image data. When the electronic device is returned from the hibernation state to the operating state, the image data is read from the nonvolatile storage device, thereby restoring the data to the memory.

A typical information-processing device can perform an entire area hibernation that saves the entire area of a main memory to a universal serial bus (USB) memory device. The typical information-processing device may also perform a partial saving hibernation that saves only a portion of the area of the main memory to a universal serial bus (USB) memory device or the like.

In general, a memory area of an electronic device, such as a printing apparatus, is often classified into two categories. One of the categories is an area into which a software program is deployed (hereinafter referred to as "operating system (OS) memory area"). The other category is an area into which temporary data such as temporary image processing data is deployed (hereinafter referred to as "input/output (IO) memory area").

In the typical hibernation technology, the temporary data stored in the IO memory area may be saved to the nonvolatile storage device.

SUMMARY

An electronic device according to an embodiment of the present disclosure includes a first memory, a main processor, and a nonvolatile memory device. The first memory is configured to include a plurality of memory areas. The main processor is configured to: (i) determine whether or not specific data is stored in a first IO memory area of the first memory, wherein the specific data is used frequently during normal operation of the electronic device; (ii) generate, based on determining that the specific data is not stored in the first IO memory area, a first piece of image data based on an OS memory area of the first memory, wherein the first piece of image data includes a software program; (iii) store the generated first piece of image data to the nonvolatile storage device at a first time; (iv) generate, based on determining that the specific data is stored in the first IO memory area, a second piece of image data based on the OS memory area of the first memory and an IO memory area of the first memory, wherein the second piece of image data includes the software program and the specific data; (v) store the generated second piece of image data to the nonvolatile storage device at the first time; (vi) restore, based on the first piece of image data being stored in the nonvolatile storage device, the software program to the OS memory area from the stored first piece of image data at a second time; and (vii) restore, based on the second piece of image data being stored in the nonvolatile storage device, the software program to the OS memory area and the specific data to the first IO memory area from the stored second piece of image data at the second time.

A suspend control method according to an embodiment of the present disclosure includes: determining, via a main processor that executes a suspend control program, whether or not specific data is stored in a first IO memory area of a first memory, wherein the specific data is used frequently during normal operation of the main processor; generating, via the main processor, based on determining that the specific data is not stored in the first IO memory area, a first piece of image data based on an OS memory area of the first memory, wherein the first piece of image data includes a software program; storing, via the main processor, the generated first piece of image data to a nonvolatile storage device at a first time; generating, via the main processor, based on determining that the specific data is stored in the first IO memory area, a second piece of image data based on the OS memory area of the first memory and the first IO memory area of the first memory, wherein the second piece of image data includes the software program and the specific data; storing, via the main processor, the generated second piece of image data to the nonvolatile storage device at the first time; restoring, via the main processor, based on the first piece of image data being stored in the nonvolatile storage device, the software program to the OS memory area from the stored first piece of image data at a second time; and restoring, via the main processor, based on the second piece of image data being stored in the nonvolatile storage device, the software program to the OS memory area and the specific data to the first IO memory area from the stored second piece of image data at the second time.

A non-transitory computer-readable recording medium according to an embodiment of the present disclosure has stored thereon a suspend control program that is executable by a main processor of an electronic device. The suspend control program includes first to seventh program codes. The first program code causes the main processor to determine whether or not specific data is stored in a first IO memory area, wherein the specific data is used frequently during normal operation of the electronic device. The second program code causes the main processor to generate, based on determining that the specific data is not stored in the first IO memory area, a first piece of image data based on an OS memory area of the first memory, wherein the first piece of image data includes a software program. The third program code causes the main processor to store the generated first piece of image data to the nonvolatile storage device at a first time. The fourth program code causes the main processor to generate, based on determining that the specific data is stored in the first IO memory area, a second piece of image data based on the OS memory area of the first memory and the first IO memory area of the first memory, wherein the second piece of image data includes the software program and the specific data. The fifth program causes the main processor to store the generated second piece of image data to the nonvolatile storage device at the first time. The sixth program code causes the main processor to restore, based on the first piece of image data being stored in the nonvolatile storage device, the software program to the OS memory area from the stored first piece of image data at a second time. The seventh program code causes the main processor to restore, based on the second piece of image data being stored in the nonvolatile storage device, the software program to the OS memory area and the specific data to the first IO memory area from the stored second piece of image data at the second time.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Embodiments of the present disclosure are described herein with reference to the accompanying drawings.

A first embodiment of the present disclosure is described below.

Figure 1:
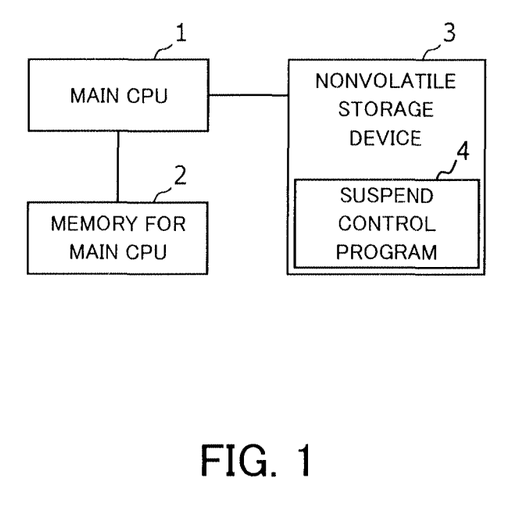
FIG. 1 illustrates a configuration of an electronic device according to a first embodiment of the present disclosure.

FIG. 1 illustrates a configuration of an electronic device according to the first embodiment. The electronic device may be, for example, an image forming apparatus configured to perform image processing and printing of an image subjected to the image processing.

The electronic device illustrated in FIG. 1 may include a main central processing unit (CPU) 1, a memory 2 connected to the main CPU 1, and a nonvolatile storage device 3 connected to the main CPU 1.

The main CPU 1 may be a main processor that performs specific processing, such as the image processing. The memory 2 for the main CPU 1 may be a random access memory (RAM) used by the main CPU 1. The nonvolatile storage device 3 may be, for example, a flash memory configured to store a suspend control program 4 that causes the electronic device to store image data responsive to shifting to a suspension mode, a hibernation mode, or the like.

At the time of suspend, power supply to the main CPU 1, the memory 2 for the main CPU 1, and the nonvolatile storage device 3 is stopped.

Figure 2:
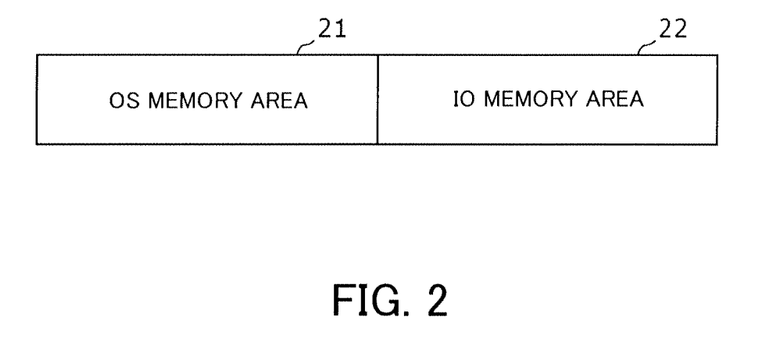
FIG. 2 illustrates an example of a diagram of a memory configuration of a memory for a main CPU according to the first embodiment of the present disclosure.

FIG. 2 illustrates an example of a diagram of a memory configuration of the memory 2 for the main CPU 1 according to the first embodiment of the present disclosure. The memory 2 for the main CPU 1 includes an OS memory area 21 and an IO memory area 22. Software programs such as an operating system, an application, and data used by the operating system may be deployed into the OS memory area 21. Specific data may be stored in the IO memory area 22. In other words, data used for processing executed by the main CPU 1 may be stored in the IO memory area 22.

Identification data (for example, a flag) indicating whether or not specific data is stored in the IO memory area 22 may stored in the memory 2 for the main CPU 1.

Note that, the specific data may include data that is temporarily used when the electronic device is operated, and may be data associated with a particular application or cache data. The specific data may be, for example, font cache data or dictionary data used for optical character recognition (OCR).

Note that, a particular application may store the specific data in the IO memory area 22. Additionally, each kind of application may store a specific type of data (such as cache data) in the IO memory area 22.

Note that, based on a particular application program, when the specific data is stored in the IO memory area 22, the main CPU 1 may set the identification data thereon to a value indicating that the specific data is stored in the IO memory area 22. Also note that, for particular application programs, when all pieces of the specific data are erased from the IO memory area 22, the main CPU 1 may set the identification data thereon to a value indicating that the specific data is not stored in the IO memory area 22.

When entering a suspension state, a hibernation state, or the like (which may be hereinafter referred to as "suspending" or "suspension"), based on the suspend control program 4, the main CPU 1 may determine, based on the value of the above-mentioned identification data, whether or not the specific data is stored in the IO memory area 22 of the memory 2 for the main CPU 1. Then, when the specific data is not stored in the IO memory area 22, the main CPU 1 may generate image data (hereinafter referred to as "first piece of image data") from the OS memory area 21 and store the image data in the nonvolatile storage device 3. Otherwise, when the specific data is stored in the IO memory area 22, the main CPU 1 may generate image data (hereinafter referred to as "second piece of image data") from the OS memory area 21 and the IO memory area 22 and store the image data in the nonvolatile storage device 3.

Further, when returning to a normal state, an operating state, or the like (which may be hereinafter referred to as "resuming" or "end of suspension") from a suspension state, a hibernation state, or the like, based on the suspend control program 4, the main CPU 1 may restore the software program and the like in the OS memory area 21 based on the first piece of image data when the first piece of image data is stored in the nonvolatile storage device 3. Otherwise, when the second piece of image data is stored in the nonvolatile storage device 3, the main CPU 1 may restore the software program and the like in the OS memory area 21 and restore the data within the IO memory area 22 based on the second piece of image data.

Next, a description is made of suspend operation of the above-mentioned electronic device.

Figure 3:
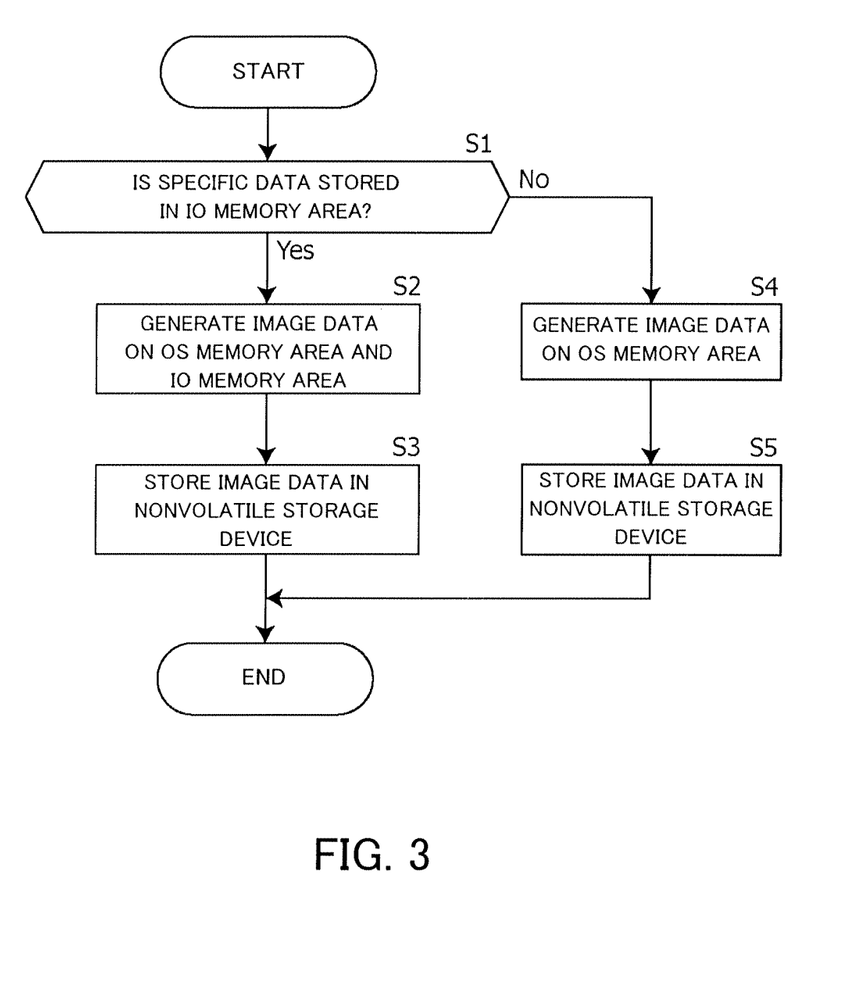
FIG. 3 illustrates steps of processing performed at a start time of suspend of the electronic device according to the first embodiment of the present disclosure.

FIG. 3 illustrates steps of processing performed at the start time of suspend of the electronic device according to the first embodiment of the present disclosure.

At the start time of suspension, based on the suspend control program 4, the main CPU 1 may determine, based on the value of the above-mentioned identification data, whether or not the specific data is stored in the IO memory area 22 of the memory 2 for the main CPU 1 (Step S1).

When the specific data is stored in the IO memory area 22, based on the suspend control program 4, the main CPU 1 may generate the image data (second piece of image data) including both the OS memory area 21 and the IO memory area 22 (Step S2), and may also store the image data in the nonvolatile storage device 3 (Step S3).

On the other hand, when the specific data is not stored in the IO memory area 22, based on the suspend control program 4, the main CPU 1 may generate the image data (i.e. first piece of image data) on only the OS memory area 21 (Step S4), and may also store the image data in the nonvolatile storage device 3 (Step S5).

In this manner, at the start time of suspension, the saving of the program and the data stored in the memory 2 for the main CPU 1 may be executed, and the power supply to the main CPU 1, the memory 2 for the main CPU 1, and the nonvolatile storage device 3 may be stopped or otherwise interrupted.

Then, when the power supply to the main CPU 1, the memory 2 for the main CPU 1, and the nonvolatile storage device 3 is restarted, restoration processing is executed at the end time of suspension as follows.

When the first piece of image data is stored in the nonvolatile storage device 3, based on the suspend control program 4, the main CPU 1 may read the first piece of image data from the nonvolatile storage device 3, and may also restore the program and the like within the OS memory area 21 based on the first piece of image data.

When the second piece of image data is stored in the nonvolatile storage device 3, based on the suspend control program 4, the main CPU 1 may read the second piece of image data from the nonvolatile storage device 3, and may also restore the program and the like within the OS memory area 21 and the data within the IO memory area 22 based on the second piece of image data.

As described above, it is possible to appropriately save and/or restore temporary data to be saved and/or restored at the when suspending without requiring a user's intention.

Note that, in the first embodiment, setting items may be provided for a hibernation mode. A full hibernation that performs the saving and/or restoration of the data within both the OS memory area 21 and the IO memory area 22, a partial hibernation that performs the saving and/or restoration of the data within only the OS memory area 21, and an automatic selection mode that automatically selects any one of the full hibernation and the partial hibernation as described above can be set as the setting items, and the saving and/or restoration may be performed in the mode set in the setting item.

Next, a second embodiment of the present disclosure is described.

Figure 4:
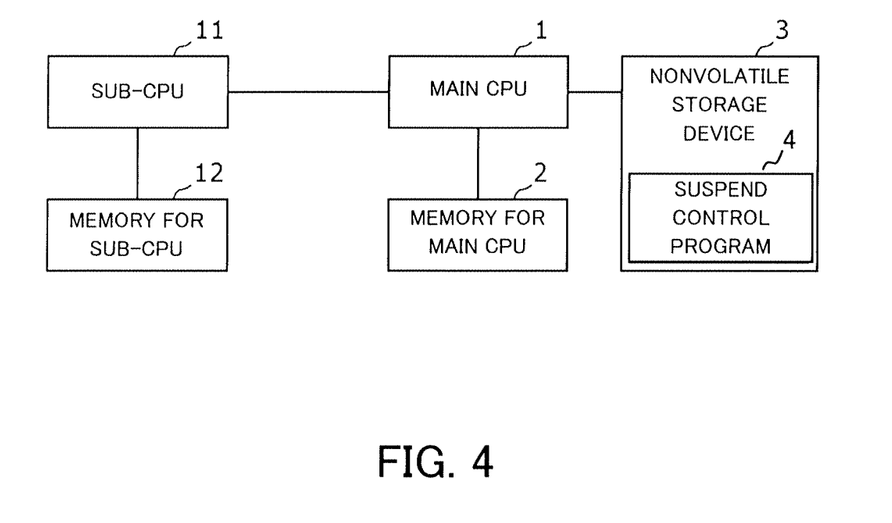
FIG. 4 illustrates a configuration of an electronic device according to a second embodiment of the present disclosure.

FIG. 4 illustrates a configuration of an electronic device according to the second embodiment. The electronic device may be, for example, an image forming apparatus configured to perform image processing and printing of an image subjected to the image processing.

The electronic device illustrated in FIG. 4 includes the main central processing unit (CPU) 1, the memory 2 for a main CPU 1, and the nonvolatile storage device 3.

Note that, a sub-CPU 11 and a memory 12 for a sub-CPU may be a subsystem built into this electronic device, or may be an external system connected through a network or the like.

The main CPU 1 is a main processor that performs specific processing such as the image processing. The memory 2 for the main CPU 1 may be a random access memory (RAM) used by the main CPU 1. The nonvolatile storage device 3 may be, for example, a flash memory configured to store the suspend control program 4 that causes the electronic device to store image data responsive to shifting to a suspension mode, a hibernation mode, or the like.

When suspending, power supplied to the main CPU 1, the memory 2 for the main CPU 1, and the nonvolatile storage device 3 may be stopped or otherwise interrupted. Note that, even when suspending, power is continuously supplied to the sub-CPU 11 and the memory 12 for the sub-CPU. The sub-CPU 11 may be a processor other than the main CPU 1. The memory 12 for the sub-CPU may be a RAM used by the sub-CPU 11.

Figure 5:
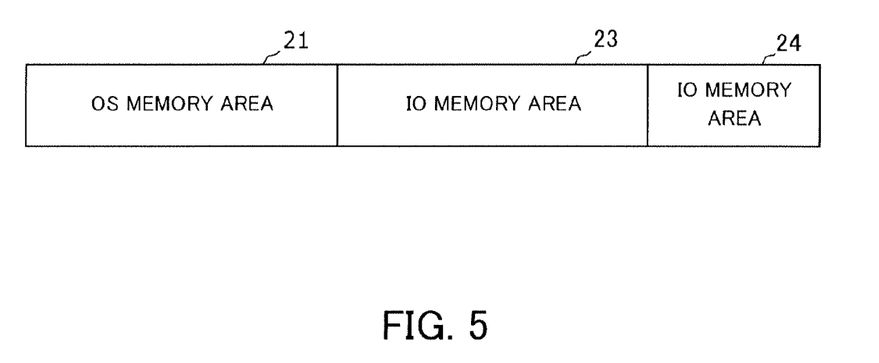
FIG. 5 illustrates an example of a diagram of a memory configuration of a memory for the main CPU according to the second embodiment of the present disclosure.

FIG. 5 illustrates an example of a diagram of a memory configuration of the memory 2 for the main CPU 1 according to the second embodiment of the present disclosure. The memory 2 for the main CPU 1 includes the OS memory area 21, an IO memory area 23, and an IO memory area 24. The software programs of the operating system and the application and the data used by the operating system are deployed into the OS memory area 21. Data that does not need to be saved when suspending may be stored in the IO memory area 23. Data that needs to be saved at the time of suspend may be stored in the IO memory area 24. In other words, specific data that needs to be when suspending may be stored in the IO memory area 24, and the other data may be stored in the IO memory area 23 provided separately from the IO memory area 24.

The specific data may be the data that is temporarily used when the electronic device is operated and may be, for example, font cache data or dictionary data for optical character recognition (OCR). Here, a part or all of the data that is temporarily used may be stored in the IO memory area 24 as the specific data based on a particular setting or configuration.

Note that, the particular application may store the specific data in the IO memory area 24, or each kind of application may store a specific type of data (such as cache data) in the IO memory area 24.

At the start time of suspend, based on the suspend control program 4, the main CPU 1 may generate image data (hereinafter referred to as "first piece of image data") on the OS memory area 21 and may also store image data in the nonvolatile storage device 3. Then, the main CPU 1 may generate image data (hereinafter referred to as "third piece of image data") on the IO memory area 24, transfer the image data to the sub-CPU 11, and store the image data in the memory 12 for the sub-CPU.

Further, at the end time of suspend, based on the suspend control program 4, the main CPU 1 may read the first piece of image data from the nonvolatile storage device 3, and may also restore the software program and the like in the OS memory area 21 based on the first piece of image data. The main CPU 1 may then transfer the third piece of image data stored in the memory 12 for the sub-CPU from the sub-CPU 11, and may also restore the specific data in the IO memory area 24 based on the third piece of image data.

Further, when suspending and resuming, based on the suspend control program 4, the main CPU 1 identifies whether to perform full hibernation or partial hibernation. When the hibernation mode is the partial hibernation, the main CPU 1 may perform the saving and/or restoration of the data within only the OS memory area 21 and the IO memory area 24 in the above-mentioned manner. Note that, the hibernation mode is one of setting items, and may be set by the user.

On the other hand, when the hibernation mode is the full hibernation, based on the suspend control program 4, the main CPU 1 may generate image data (hereinafter referred to as "fourth piece of image data") on the IO memory area 23 and the OS memory area 21 and may also store the image data in the nonvolatile storage device 3 at the start time of suspend. At the end time of suspension, the main CPU 1 may read the fourth piece of image data from the nonvolatile storage device 3 and restore the software program and the like in the OS memory area 21 and the data within the IO memory area 23 based on the fourth piece of image data. Note that, even when the hibernation mode is the full hibernation, the same saving and/or restoration as when the hibernation mode is the partial hibernation is performed for the IO memory area 24.

Next, a description is made of suspend operation of the above-mentioned electronic device.

Figure 6:
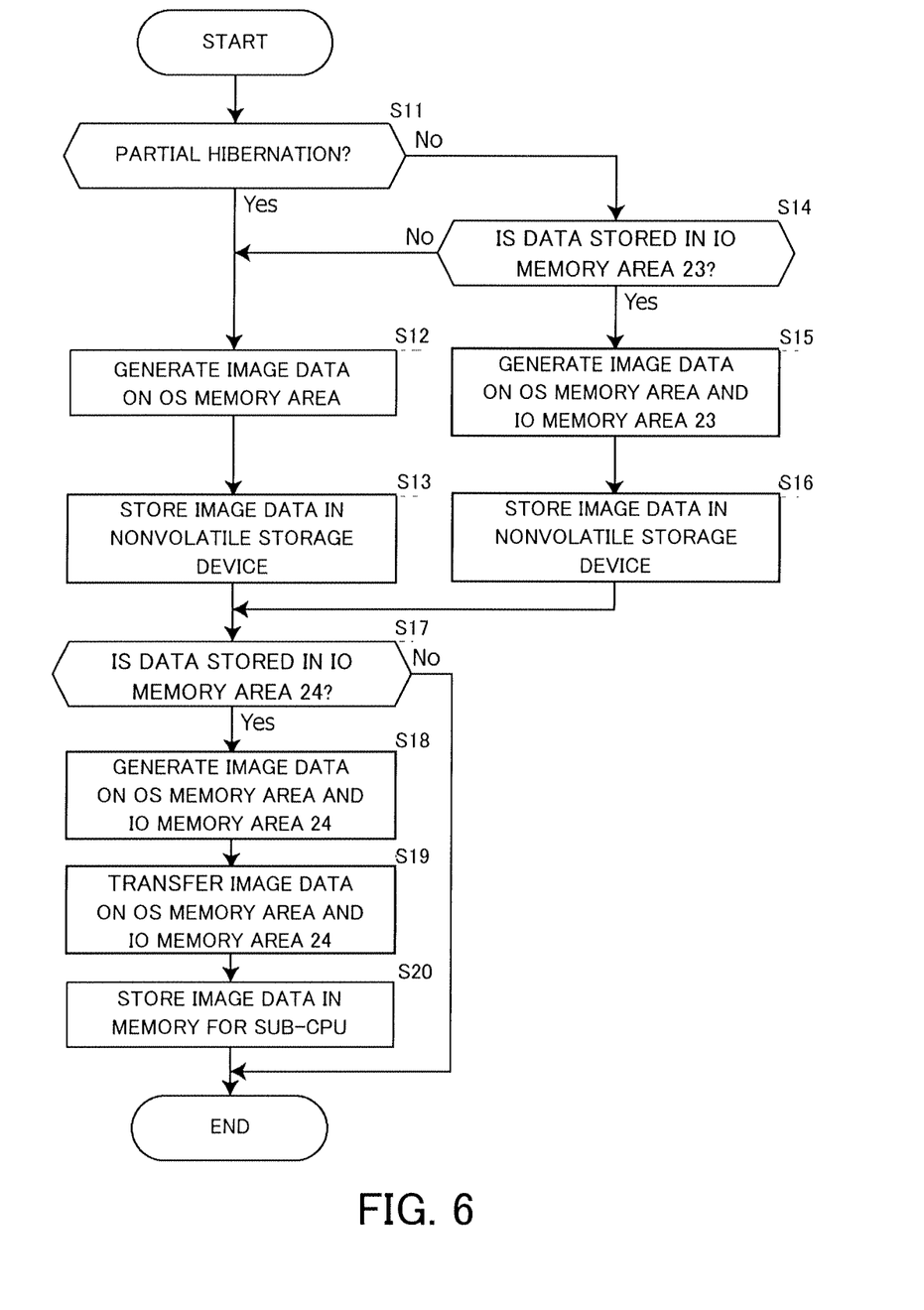
FIG. 6 illustrates steps of processing performed at the start time of suspend of the electronic device according to the second embodiment of the present disclosure.

FIG. 6 illustrates steps of processing performed at the start time of suspend of the electronic device according to the second embodiment of the present disclosure.

At the start time of suspension, based on the suspend control program 4, the main CPU 1 may determine whether to perform full hibernation or partial hibernation as the hibernation mode (Step S11).

When the hibernation mode is the partial hibernation, the main CPU 1 may generate the image data (first piece of image data) on the OS memory area 21 (Step S12) and may store the image data in the nonvolatile storage device 3 (Step S13) in the above-mentioned manner.

On the other hand, when the hibernation mode is the full hibernation, based on the suspend control program 4, the main CPU 1 may determine whether or not data is stored in the IO memory area 23 (Step S14). When the data is stored in the IO memory area 23, the main CPU 1 may generate the image data (fourth piece of image data) on the OS memory area 21 and the IO memory area 23 (Step S15) and may also store the image data in the nonvolatile storage device 3 (Step S16) in the above-mentioned manner.

Note that, when data is not stored in the IO memory area 23, the main CPU 1 may generate the image data (first piece of image data) on the OS memory area 21 (Step S12) and may also store the image data in the nonvolatile storage device 3 (Step S13) in the above-mentioned manner.

Then, based on the suspend control program 4, the main CPU 1 may determine whether or not data is stored in the IO memory area 24 (Step S17). When data is stored in the IO memory area 24, the main CPU 1 may generate the image data (third piece of image data) on the IO memory area 24 (Step S18), transfer the image data to the sub-CPU 11 (Step S19), and store the image data in the memory 12 for the sub-CPU (Step S20).

In this manner, at the start time of suspension, the saving of the program and the data stored in the memory 2 for the main CPU 1 may be executed, and the power supply to the main CPU 1, the memory 2 for the main CPU 1, and the nonvolatile storage device 3 may be stopped or otherwise interrupted.

Then, when the power supply to the main CPU 1, the memory 2 for the main CPU 1, and the nonvolatile storage device 3 is restarted, the restoration processing may be executed when resuming from suspension.

When the first piece of image data is stored in the nonvolatile storage device 3, based on the suspend control program 4, the main CPU 1 may read the first piece of image data from the nonvolatile storage device 3, and may restore the program and the like within the OS memory area 21 based on the first piece of image data.

When the fourth piece of image data is stored in the nonvolatile storage device 3, based on the suspend control program 4, the main CPU 1 may read the fourth piece of image data from the nonvolatile storage device 3, and may restore the program and the like within the OS memory area 21 and the data within the IO memory area 23 based on the fourth piece of image data.

In addition, the main CPU 1 may transfer the third piece of image data from the sub-CPU 11, and may restore the data within the IO memory area 24 based on the third piece of image data.

With the above-mentioned configuration, the data within the IO memory area 24 may be saved to another system (such as sub-CPU 11 and memory 12 for the sub-CPU). Thus, even when the saving and/or restoration is performed for the IO memory area 24 along with the OS memory area 21, the time required for the restoration of the data within the OS memory area 21 can be significantly reduced.

Note that, the first and second embodiments are examples of the present disclosure, but the present disclosure is not limited thereto, and various modifications and changes can be made within the scope that does not depart from the gist of the present disclosure.

The present disclosure can be applied to, for example, an image forming apparatus such as a printer or a multifunction peripheral.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electronic device, comprising:
   a first memory configured to include a plurality of memory areas;
   a nonvolatile storage device;
   a main processor;
   a sub-processor; and
   a second memory connected to the sub-processor, wherein the main processor is configured to:
   determine whether or not specific data is stored in a first IO memory area of the first memory, wherein the specific data is used frequently during normal operation of the electronic device;
   generate, based on determining that the specific data is not stored in the first IO memory area, a first piece of image data based on an OS memory area of the first memory, wherein the first piece of image data includes a software program;
   generate, based on determining that the specific data is stored in the first IO memory area, the first piece of image data and a second piece of image data based on the first IO memory area of the first memory, wherein the second piece of image data includes the specific data;
   store the generated first piece of image data to the nonvolatile storage device at a first time;
   transfer the generated second piece of image data to the sub-processor to store the generated second piece of image data to the second memory at the first time;
   restore, based on the first piece of image data being stored in the nonvolatile storage device, the software program to the OS memory area from the stored first piece of image data at a second time; and restore, based on the second piece of image data being stored in the second memory, the specific data to the first IO memory area from the stored second piece of image data at the second time.

2. The electronic device according to claim 1, wherein the second time is after the first time.

3. The electronic device according to claim 1, wherein the main processor is configured to:
   identify a particular hibernation mode from a plurality of hibernation modes of the electronic device, wherein the plurality of hibernation modes includes a full hibernation mode and a partial hibernation mode;
   based on identifying that the particular hibernation mode is the full hibernation mode:
      generate a third piece of image data from the OS memory area and a second IO memory area, wherein the second IO memory area is a remaining area of the first memory that is not the first IO memory area,
      store the generated third piece of image data to the nonvolatile storage device,
      read, at the second time, the stored third piece of image data from the nonvolatile storage device,
      restore the software program to the OS memory area and data within the second IO memory area from the read third piece of image data.

4. The electronic device according to claim 1, wherein the main processor is configured to:
   identify a particular hibernation mode from a plurality of hibernation modes of the electronic device, wherein the plurality hibernation modes includes a full hibernation mode and a partial hibernation mode;
   based on determining that the particular hibernation mode is the partial hibernation mode:
      generate the first piece of image data;
      store the generated first piece of image data to the nonvolatile storage device;
      read the stored first piece of image data from the nonvolatile storage device;
      restore the software program to the OS memory area from the read first piece of image data.

5. The electronic device according to claim 1, wherein the specific data includes data that is temporarily used when the electronic device is operated.

6. A suspend control method, comprising:
   determining, via a main processor that executes a suspend control program, whether or not specific data is stored in a first IO memory area of a first memory, wherein the specific data is used frequently during normal operation of the main processor;
   generating, via the main processor, based on determining that the specific data is not stored in the first IO memory area, a first piece of image data based on an OS memory area of the first memory, wherein the first piece of image data includes a software program;
   generating, via the main processor, based on determining that the specific data is stored in the first IO memory area, the first piece of image data and a second piece of image data based on the first IO memory area of the first memory, wherein the second piece of image data includes the specific data;
   storing, via the main processor, the generated first piece of image data to a nonvolatile storage device at a first time;
   transferring, via the main processor, the generated second piece of image data to a sub-processor to store the generated second piece of image data to a second memory connected to the sub-processor at the first time;
   restoring, via the main processor, based on the first piece of image data being stored in the nonvolatile storage device, the software program to the OS memory area from the stored first piece of image data at a second time; and
   restoring, via the main processor, based on the second piece of image data being stored in the second memory the specific data to the first IO memory area from the stored second piece of image data at the second time.

7. The suspend control method according to claim 6, wherein the second time is after the first time.

8. The suspend control method according to claim 6, further comprising:
   identifying, via the main processor, a particular hibernation mode from the plurality of hibernation modes of the electronic device, wherein the plurality of hibernation modes includes a full hibernation mode and a partial hibernation mode;
   based on identifying that the particular hibernation mode is the full hibernation mode:
      generating, via the main processor, a third piece of image data from the OS memory area and a second IO memory area, wherein the second IO memory area is a remaining area of the first memory that is not the first IO memory area;
      storing, via the main processor, the generated third piece of image data to the nonvolatile storage device;
      reading, via the main processor, at the second time, the stored third piece of image data from the nonvolatile storage device;
      restoring, via the main processor, the software program to the OS memory area and data within the second IO memory area from the read third piece of image data.

9. The suspend control method according to claim 6, further comprising:
   identifying, via the main processor, a particular hibernation mode from the plurality of hibernation modes of the electronic device, wherein the plurality of hibernation modes includes a full hibernation mode and a partial hibernation mode;
   based on identifying that the particular hibernation mode is the partial hibernation mode:
      generating, via the main processor, the first piece of image data;
      storing the generated first piece of image data to the nonvolatile storage device;
      reading, via the main processor, the stored first piece of image data from the nonvolatile storage device;
      restoring the software program to the OS memory area from the read first piece of image data.

10. The suspended control method according to claim 6, wherein the specific data includes data that is temporarily used when an electronic device is operated.

11. A non-transitory computer-readable recording medium having stored thereon a suspend control program executable by a main processor of an electronic device, the suspend control program comprising:
   a first program code that causes the main processor to determine whether or not specific data is stored in a first IO memory area of a first memory, wherein the specific data is used frequently during normal operation of the electronic device;
   a second program code that causes the main processor to generate, based on determining that the specific data is not stored in the first IO memory area, a first piece of image data based on an OS memory area of the first memory, wherein the first piece of image data includes a software program;

a third program code that causes the main processor to generate, based on determining that the specific data is stored in the first IO memory area, the first piece of image data and a second piece of image data based on the first IO memory area of the first memory, wherein the second piece of image data includes the specific data;

a fourth program code that causes the main processor to store the generated first piece of image data to the nonvolatile storage device at a first time;

a fifth program that causes the main processor to transfer the generated second piece of image data to a sub-processor to store the generated second piece of image data to a second memory connected to the sub-processor at the first time;

a sixth program code that causes the main processor to restore, based on the first piece of image data being stored in the nonvolatile storage device, the software program to the OS memory area from the stored first piece of image data at a second time; and a seventh program code that causes the main processor to restore, based on the second piece of image data being stored in the second memory, the specific data to the first IO memory area from the stored second piece of image data at the second time.

12. The non-transitory computer-readable recording medium according to claim 11, wherein the second time is after first time.

13. The non-transitory computer-readable recording medium according to claim 11, wherein the suspend control program further comprises:

a seventeenth program code that causes the main processor to identify a particular hibernation mode from a plurality of hibernation modes of the electronic device, wherein the plurality of hibernation modes includes a full hibernation mode and a partial hibernation mode; and an eighteenth program code that causes the main processor to, based on identifying that the hibernation mode is the full hibernation mode:

generate a third piece of image data from the OS memory area and a second IO memory area, wherein the second IO memory area is a remaining area of the first memory that is not the first IO memory area;

store the generated third piece of image data to the nonvolatile storage device;

read, at the second time, the stored third piece of image data from the nonvolatile storage device; and restore the software program to the OS memory area and data within the second IO memory area from the read third piece of image data.

14. The non-transitory computer-readable recording medium according to claim 11, wherein the suspend control program further comprises:

a nineteenth program code that causes the main processor to identify a particular hibernation mode from a plurality of hibernation modes of the electronic device, wherein the plurality of hibernation modes includes a full hibernation mode and a partial hibernation mode; and a twentieth program code that causes the main processor to, based on identifying that the hibernation mode is the partial hibernation mode:

generate the first piece of image data, store the generated first piece of image data to the nonvolatile storage device;

read the stored first piece of image data from the nonvolatile storage device; and restore the software program to the OS memory area from the read first piece of image data.

15. The non-transitory computer-readable recording medium according to claim 11, wherein the specific data comprises data that is temporarily used when the electronic device is operated.

* * * * *